J. Young,

Washing Machine,

No. 1,384. Reissued Jan. 6, 1863.

Witnesses;
N. W. Stearns
W. B. Teschemacher

Inventor;
John Young, pr his attorney
Saml. Cooper

N. PETERS, PHOTO-LITHOGRAPHER, WASHINGTON, D. C.

UNITED STATES PATENT OFFICE.

JOHN YOUNG, OF WEST GALWAY, NEW YORK.

IMPROVED WASHING AND WRINGING MACHINE.

Specification forming part of Letters Patent No. 5,788, dated September 19, 1848; Reissue No. 111, dated July 30, 1861; Reissue No. 1,384, dated January 6, 1863.

DIVISION A.

*To all whom it may concern:*

Be it known that I, JOHN YOUNG, of West Galway, in the county of Fulton and State of New York, have invented certain new and useful Improvements in Machines for Washing Clothes, of which the following is a full, clear, and exact description, reference being had to the accompanying drawings, making part of this specification, in which—

Figure 1:
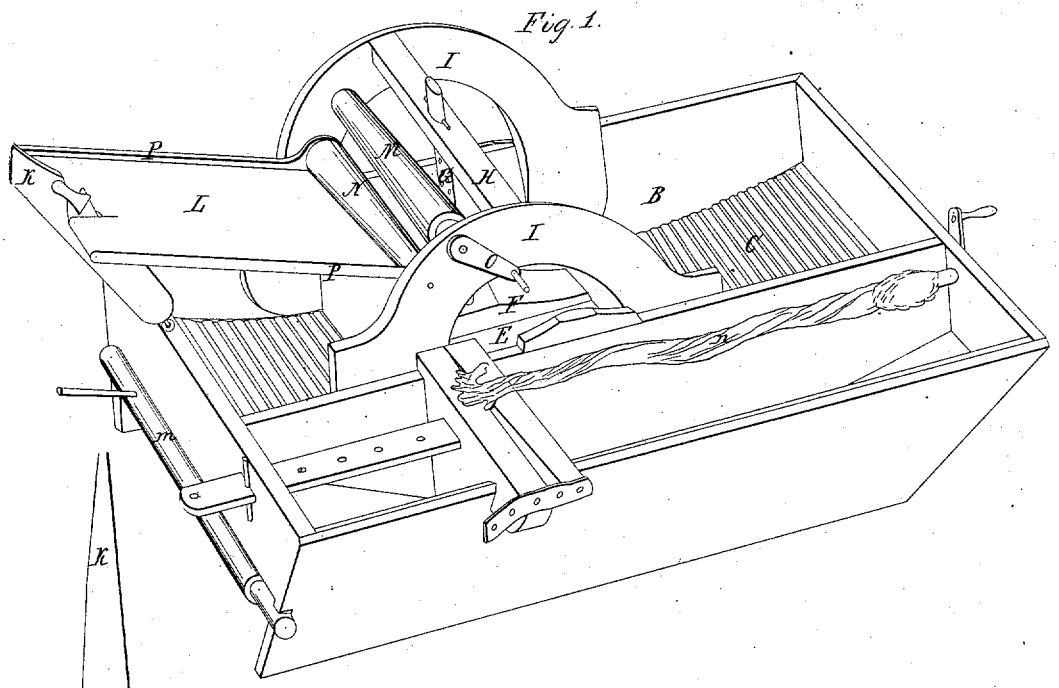
Figure 2:
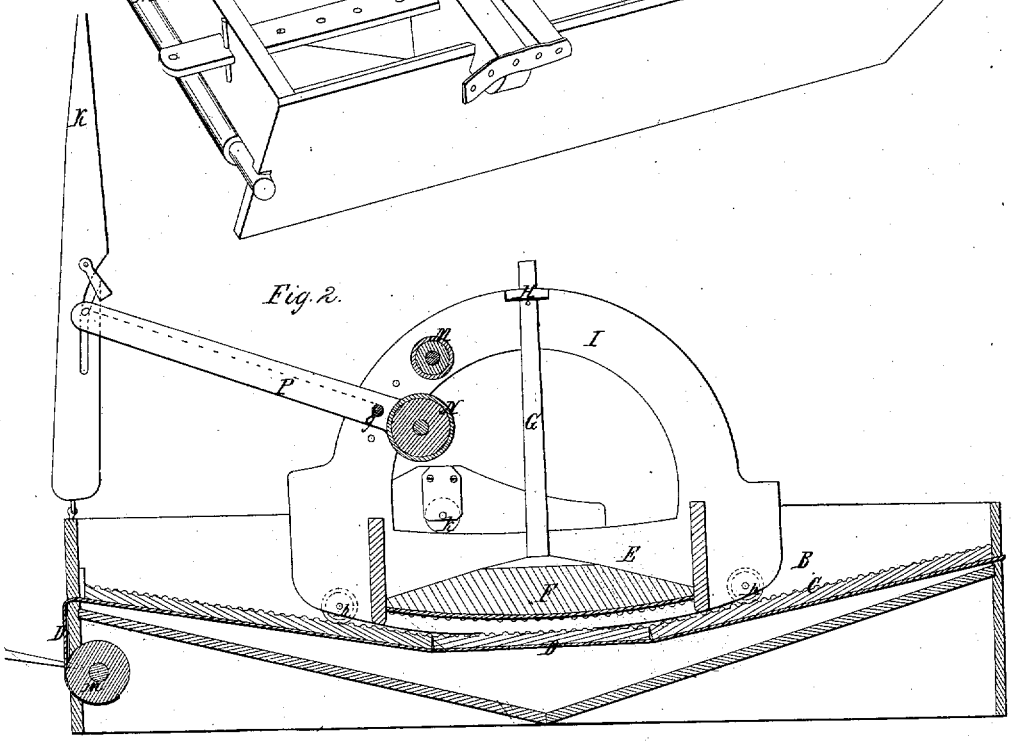

Figure 1 is a perspective view of my improved machine; Fig. 2, a vertical longitudinal section through the same.

The first part of my invention consists in the employment of a pair of pressure-rollers, between which the clothes are passed either for the purpose of rubbing them in the process of washing, or of squeezing or expressing the water therefrom after they are washed, in combination with a hinged platform for the purpose of receiving them after they have passed through the rolls.

The second part of my invention consists in the employment of conical rollers, between which the clothes are passed, for the purpose of producing a rubbing as well as a squeezing action upon the clothes, which greatly accelerates the operation of washing, as will now be more particularly described and set forth.

To enable others skilled in the art to understand my invention, I will proceed to describe the manner in which I have carried it out.

In the accompanying drawings, the box *a* to contain the suds and clothes may be made of any suitable form, having through its middle a vertical division-board, *b*, for the purpose of separating the rubbing from the wringing apparatus. The wash-board *c* is made in segments, which are suspended on a cord, *d*, either passing through or beneath them. The upper surfaces of these segments are fluted, in the manner of a common wash-board. Upon this wash-board is placed a rubbing-box, *e*, which runs on friction-wheels *e'*, which rest in grooves parallel to the sides and formed in the flexible wash-board, into which the clothes to be washed are placed. Upon the clothes so placed in the box a follower, *f*, is put to press them down, which follower has a stem, *h*, projecting upward to the cross-piece *g*, through which it passes. The rubbing-box is held in its position by the friction-rollers *i*, which are placed on the sides of the box for this purpose.

On the sides of the rubbing-box the arched frames A are raised, which are connected on the top by the cross-piece *g*. The follower *f* is held down upon the clothes by passing a pin through its stem beneath the cross-piece *g*. Between these arches the conical squeezing-rollers $j$ $j^2$ are placed, the roller *j* turning on its axis, which rests in suitable bearings formed in the side pieces of the turning platform *k*. The joint-pin *x*, on which the platform turns, is placed to one side and below the bearing of the axis of the upper roller, $j^2$, in order that the rollers may open and shut like a pair of pinchers, to lay hold of and squeeze the water out of the clothes. The rollers are covered with gum-elastic, india-rubber, or similar material, to prevent injury to the clothes as they pass through. This, however, forms no part of my present invention, but will form the subject of another application for patent made simultaneously with this.

The conical shape of the rollers causes them, when acting together, to produce a lateral and forward rub, as well as squeeze, of the clothes; for, one being driven by the other, and the parts in contact being of changing relative diameter throughout the entire length, the driver tends to move the driven slower than itself at one end and faster at the other, thus causing constant though slight rubbing of the clothes in conjunction with the squeeze, which greatly accelerates the operation of washing.

The rubbing-box is moved backward and forward by the lever *l*, which is hinged at its lower end to the upper edge of the tub. The lever is jointed to the hinged platform *k*, which serves the double purpose of a connecting-rod and conveyer, on which the washed clothes slide down by their gravity into a basket or other receptacle placed to receive them, whenever the outer end of the same is detached from the lever *l* and dropped for that purpose.

The wash board *c* is raised up by tightening the cords on which it rests, which is done by turning the windlass *m*, to which these cords are connected.

The apparatus (*n* shown in Fig. 1) is of ordinary construction, forms no part of my invention, and therefore needs no particular description.

After placing in the box *a* the desired quantity of suds, the clothes are put into the rubber-box, and the follower forced down upon them. The operator then lays hold of the lever, and moves the box back and forth with it until the clothes are sufficiently rubbed. The follower is then taken out, and the clothes drawn through between the rollers $j$ $j^2$, sufficient pressure being applied to the outer end of the hinged platform to press the rollers together with a force adequate to express the water from the clothes.

What I claim as my invention, and desire to secure by Letters Patent, is—

1. The pressure-rollers, in combination with the hinged platform, operating as described, for the purpose set forth.

2. The conical rollers for producing a rubbing as well as squeezing action upon the clothes, as described.

JOHN YOUNG.

Witnesses:

JAMES YOUNG,

JAMES R. CALDERWOOD.